Patented June 28, 1949

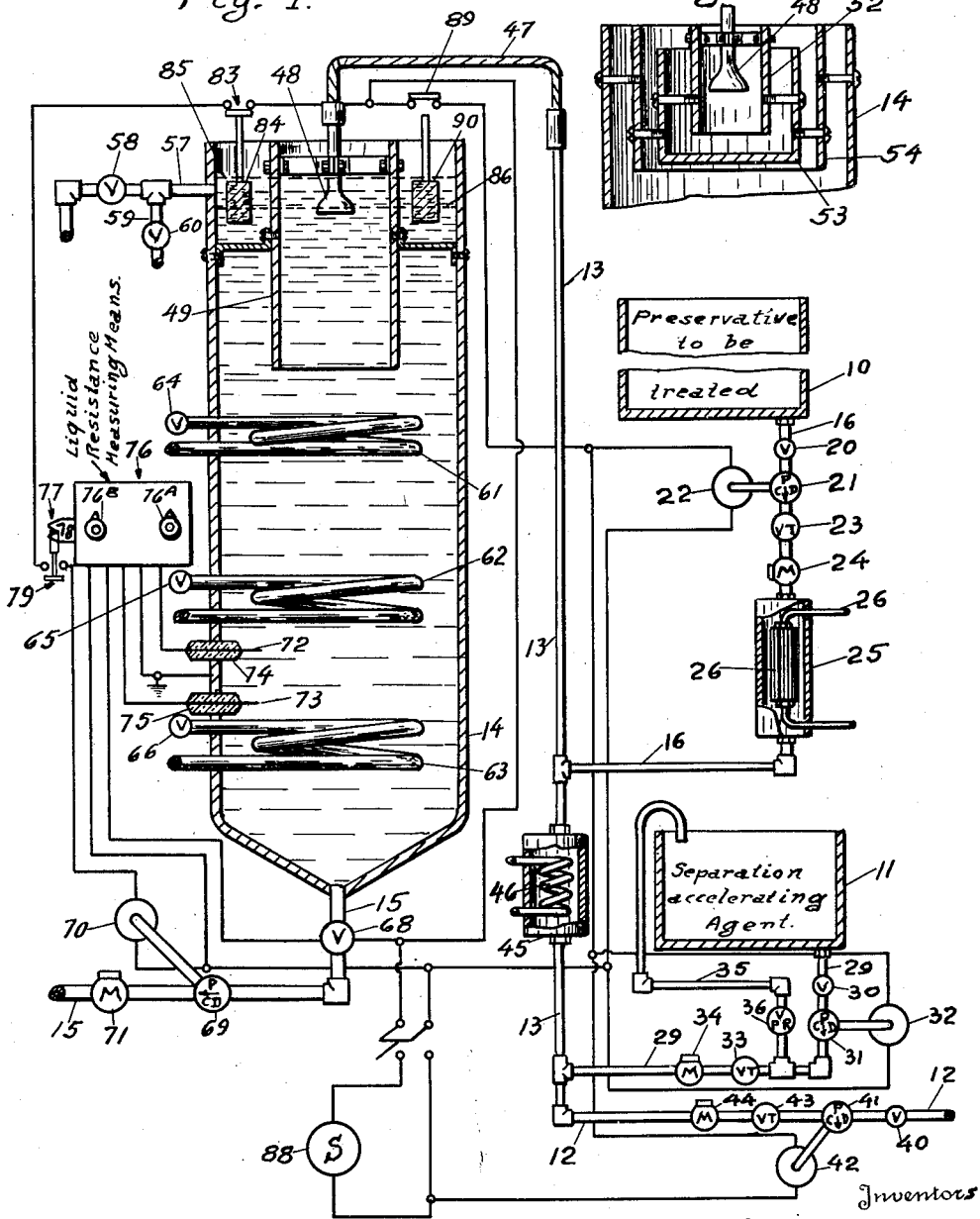

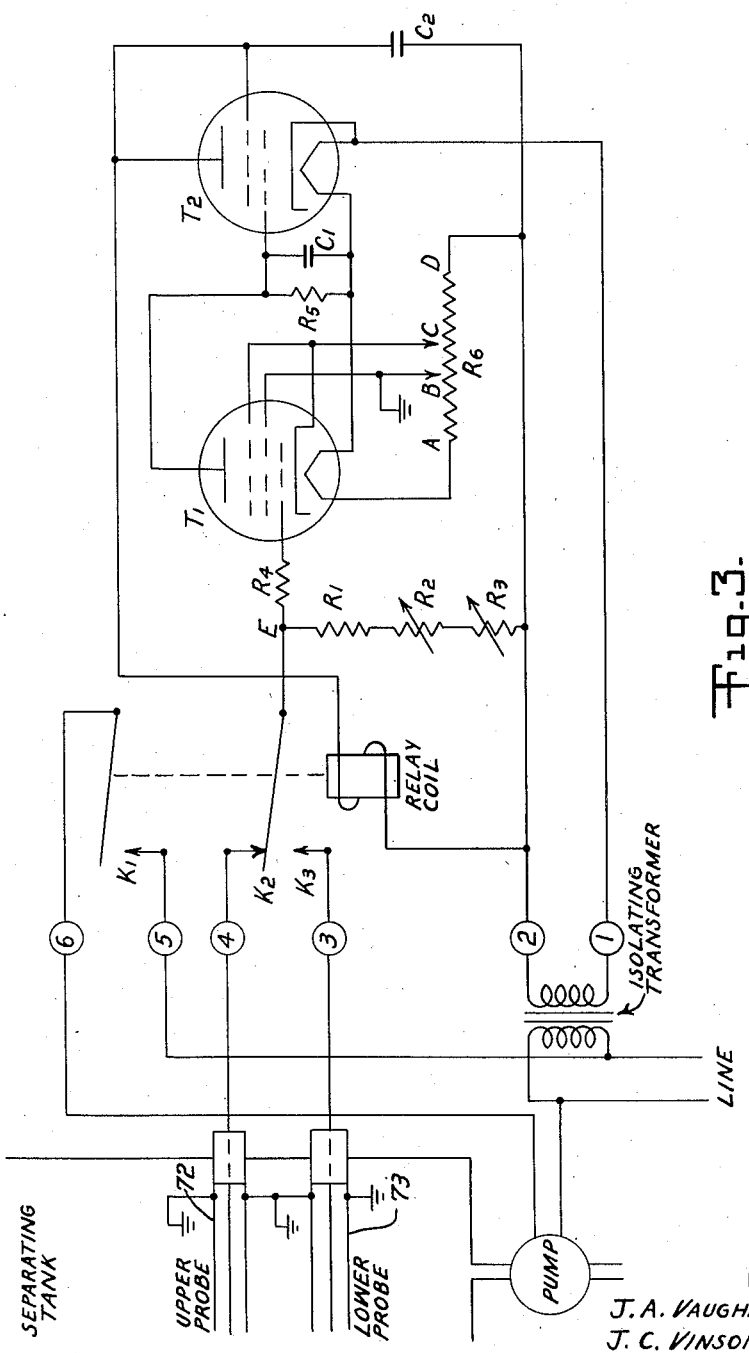

2,474,705

UNITED STATES PATENT OFFICE 2,474,705

METHOD OF AND APPARATUS FOR PARTIALLY DEHYDRATING AND CLEANSING OILY WOOD PRESERVATIVES

Joseph A. Vaughan and Joseph C. Vinson, Atlanta, Ga., assignors to Southern Wood Preserving Company, Atlanta, Ga., a corporation of Georgia Application May 29, 1944, Serial No. 537,944

9 Claims. (Cl. 210—52.6)

This invention relates generally to the treatment of oily wood preservatives, such as creosote, and it is particularly applicable to the purification and cleansing of contaminated creosote which has been used in the preservative treatment of wood.

One object of the invention is to provide for the continuous and automatic treatment of creosote or similar oily wood preservatives. Another object is to provide for the continuous withdrawal of the treated oily wood preservative from a settling tank as long as the moisture content thereof is below a predetermined per cent. A further object is to control the withdrawal of cleansed and partially dehydrated, oily wood preservative from the settling tank jointly in response to the dryness and the level of the liquid in the tank. A still further object is to control the introduction of the contaminated oily wood preservative, together with wash-water and a chemical separating agent, into the settling tank in response to the level of the liquid therein. Another object is to decrease the agitation of the liquid in the settling tank, due to the introduction of the used, oily wood preservative with the wash-water and separating agent.

Other aims and advantages of the invention will appear in the specification when considered in connection with the accompanying drawing, showing one illustrative form of apparatus for practicing the method.

In the drawing:

Fig. 1 illustrates, diagrammatically, one embodiment of the invention;

Fig. 2 is a cross sectional view of the upper portion of the settling tank shown in Fig. 1, with a modified form of baffle arrangement; and Figure 3 is a wiring diagram of the electrically controlled apparatus shown in Fig. 1.

Referring particularly to Fig. 1 of the drawing, it will be noted that the reference character 10 designates a reservoir or tank containing contaminated wood preservative which is to be purified in order to restore it to more favorable specification conditions. The preservative is an oily wood preservative, such as creosote; for example, coal-tar creosote, having a specific gravity greater than one.

The preservative to be treated is combined with a separation accelerating agent from a tank 11 and wash-water from a suitable source, indicated by the conduit 12, to flow through a conduit 13 into the upper end of a generally cylindrical settling tank 14. The partially dehydrated and cleansed preservative is withdrawn from the lower end of the tank 14 through a suitable conduit 15 to a reservoir (not shown).

The agent, such for example as NaOH, contained in the tank 11 is employed for raising the pH value and thereby accelerating the separation of the preservative from the wash-water and is chosen so as to adjust the pH value thereof to the preferred range where the separation takes place most rapidly and efficiently. Several chemicals for adjusting the pH of the solution and to hasten coalescence of one of the liquid phases in an emulsion of wash water and creosote are set forth in the patent to Vaughan and Vinson, No. 2,314,257.

The preservative to be treated flows from the tank 10 or other source through a conduit 16 which joins the conduit 13, as shown. A valve 20 is provided for shutting off the flow, if desired. Preferably, a constant delivery pump 21, driven by a suitable motor 22, is employed for forcing the contaminated preservative through the conduit 16, as controlled by a throttle valve 23. A meter 24 indicates the amount of liquid delivered to the tank through the conduit 16. Interposed in the conduit 16 for heating the liquid therein, is a suitable heat exchanger, shown as including an enlarged casing 25, within which is located a heater element 26 in the form of a return bend tube through which steam may be passed in a quantity sufficient to heat the liquid to a temperature ranging between approximately 160° F. and 180° F. To increase the heating capacity of the heat exchanger, the tube may be provided with longitudinally extending fins, as shown.

The separation accelerating agent flows through a conduit 29 from the tank 11 to the conduit 13. The flow may be shut off by a valve 30. A constant delivery pump 31, driven by a motor 32, serves to force the liquid through the conduit 29, as permitted by a throttle valve 33. A meter 34 indicates the quantity of liquid which flows through the conduit 29. If desired, a bypass conduit 35, having therein a pressure relief valve 36, can be connected to the conduit 29 between the pump 31 and the valve 33 and arranged to overflow into the tank 11 at the top thereof.

The wash-water in the conduit 12 passes through a valve 40 and is delivered by a constant delivery pump 41, driven by a motor 42. A throttle valve 43 controls the volume of flow and a meter 44 measures the same.

The combined separation accelerating agent and wash-water flow through a suitable heat exchanger conveniently in the form of an enlarged casing 45 having a heating coil 46 through which steam is caused to pass. The temperature of the liquid in the casing 45 is preferably maintained between 160° F. and 180° F.

The upper end of the conduit 13 may be connected by a flexible conduit section 47 to a spray head 48. If desired, the spray head 48 can be mounted on a float, as disclosed in Patent No. 2,314,257, for movement in accordance with changes in the level of the liquid in the tank 14.

With a view to minimizing agitation of the liquid and entrainment of air by the liquid in the tank 14, due to the inrush of liquid through the spray head 48, the spray head is submerged in the liquid within a generally cylindrical baffle 49 provided at the upper end of the tank 14 and substantially coaxially therewith. It will be apparent that the baffle 49 is for the purpose of reducing the volume subject to agitation by the inrushing liquid and thus promotes more rapid settling of the preservative.

A modified baffle arrangement is shown in Fig. 2 of the drawing. There, a cylindrical baffle 52 is arranged in close fitting relation to the spray head 48. Concentric with and spaced from the baffle 52 is an upright, cup-shaped baffle 53 into which the inrushing liquid first flows and from thence, over its upper edge, through another concentrically located baffle 54 into the tank 14.

The excess wash-water is drawn off from the top of the tank 14 above the level of the spray head through a conduit 57. A valve 58 is provided for controlling the initial overflow of water or before any preservative is withdrawn. After the system gets into automatic operation, the valve 58 is closed and the wash-water is discharged through conduit 59, as controlled by a carefully adjusted valve 60, so that the flow therethrough substantially equals the inbound flow of wash-water and the accelerating agent solution, as delivered by the pumps 31 and 41.

With a view to further accelerating separation of the preservative, heating coils 61, 62 and 63 are shown as being disposed in spaced relation, one above the other, in the tank 14. Steam delivered through valved conduits 64, 65 and 66, can be circulated through these coils in an amount sufficient to keep the temperature of the liquid within a range between 100° F. and 200° F.

A valve 68 is provided in the conduit 15 for shutting off the discharge of cleansed preservative. The flow of the liquid through the conduit 15 may be controlled by a constant delivery pump 69 driven by a motor 70. A meter 71 measures the flow.

It is desirable that the preservative withdrawn from the bottom of the tank 14 be substantially completely dehydrated, i. e., that the moisture content shall be less than 1%, preferably about ½%. For this purpose, means are provided, as will be presently described, for measuring the electrical conductivity and thereby determining the moisture content of the liquid at the lower portion of the tank 14. In addition, the measuring means is arranged to control the withdrawal of the preservative and to prevent further removal of the same when the moisture content rises above a predetermined percentage.

The conductivity measuring means includes probes 72 and 73, in the form of electrical conductors, carried by insulators 74 and 75, respectively, spaced one above the other with the probes extending into and submerged in the liquid in the tank 14. As illustrated, the probes 72 and 73 are connected to the liquid resistance measuring means, shown generally at 76, which is arranged to be responsive to change in resistance through the liquid between the plates of each probe. The electronic circuit for the probes consists of a voltage amplifier tube T—1 and a power amplifier tube T—2. Power is obtained directly from the line by dropping the voltage through a series resistor R—6. The plate supply for tube T—2 is obtained from line terminal 2 through the relay coil and from the cathode to terminal 1 so that tube T—2 is operative on half-cycles when terminal 2 is positive. The plate of tube T—1, on the other hand, is powered from line terminal 1 in series with the heater of tube T—2. The cathode is returned to a tap on R—6 which is close in potential to line terminal 2. Thus, tube T—1 is operative when terminal 1 is positive, so that T—1 and T—2 are operative on alternate half-cycles.

If the creosote around both probes is dry, there will be no electrical conducting path established to ground and point E will be substantially at the potential of terminal 2, there being no current flow through R—1, R—2 and R—3. During the half cycles, when the plate of tube T—1 is positive, its cathode will be more positive than terminal 2 by the voltage drop between C and D in R—6. The grid will thus be negative with respect to the cathode and tube T—1 will be continuously non-conductive. There will then be no voltage drop across R—5 and the grid of T—2 will be substantially at cathode potential. Tube T—2 will then conduct on alternate half-cycles and the relay will be maintained energized by energy storage capacitor C—2, holding contacts K—1 and K—3 closed.

As the moisture content of the creosote in contact with the lower probe increases, its conductivity will increase and a gradually increasing current will flow through R—1, R—2 and R—3. As a result, the voltage drop in these resistors will increase so that the potential of point E will gradually approach the potential of point C and the grid of T—1 will approach the potential of its cathode. Tube T—1 will then begin to conduct on alternate half-cycles and a voltage drop will appear across R—5, causing the grid of T—2 to assume a more and more negative potential. Current through the relay will decrease as the grid of tube T—2 approaches cut-off, until the armature changes position and closes contact K—2. Since T—1 and T—2 conduct on alternate half-cycles, the voltage drop across R—5 is maintained by capacitor C—1 through the conductive half-cycle of T—2.

If wet creosote contacts both upper and lower probes, the relay contacts will be in the position shown, as explained above. After a time, settling of the dry creosote at the bottom of the tank will finally reach the level of the upper probe and the conductivity will decrease sufficiently to cause the relay armature to change position. Contact K—2 will open and K—3 will close, removing the upper probe from the circuit and inserting the lower. Since the creosote at the lower level is even drier and less conductive, the relay will remain in this position, but the closing of K—1 will start the pump. When the dry creosote has been pumped out to the point where the level of the wet creosote has dropped to the lower probe, the conductivity will again increase sufficiently to cause the relay to drop out. K—3 will then open and K—2 will close, removing the lower probe from the circuit and inserting the upper probe, but, since the creosote of the upper level is wetter and even more conductive, the relay contacts will remain in this position. K—1 will be open and the pump will be stopped, and a new cycle will begin.

The isolating transformer is required to permit grounding of the electronic circuit independently of the line and the resistor R—4 is for the purpose of limiting the grid current in T—1 at times when point E is substantially more positive than the cathode.

The resistance measuring means 76 controls the operation of a relay, shown generally at 77, having an operating winding 78 and contact members 79 adapted to be opened on energization of the winding 78, thus opening the circuit to the motor 70 when the moisture content of the cleansed preservative is above the predetermined percentage. The function of the measuring means 76 and relay 77 is such that the contact members 79 are closed, only when the resistance between the plates of each of the probes 72 and 73 is above a predetermined value, which may be set by variable resistance knobs 76A and 76B, thereby indicating that the moisture content of the liquid adjacent both the probes is at or below the desired value satisfactory for withdrawal of the cleansed preservative. The arrangement is also such that the contact members 79 remain closed, once they are closed as a result of the conditions first described, even though the moisture content of the liquid adjacent the probe 72 rises above the desired limit, as long as the moisture content adjacent the probe 73 remains below the predetermined value. However, when the moisture content adjacent the probe 73 also rises above the predetermined value, the winding 78 is energized and the contact members 79 are opened.

It will be noted that the contact members 79 control the energization of the motor 70, which drives the pump 69. In this manner, the withdrawal of the preservative from the tank 14 is always controlled in accordance with the conductivity or moisture content thereof.

The withdrawal of the liquid from the tank 14 is further controlled in accordance with the level of the liquid in the tank by means of contact members 83, the closing and opening of which are controlled by a float 84, the position of which, of course, changes in accordance with changes in liquid level. Thus, as long as the level of the liquid remains as indicated by the broken line 85, the contact members 83 are closed and, since they are in series circuit relation with contact members 79, the energizing circuit for the motor 70 is completed thereby. However, when the liquid level falls, as to a position indicated by the broken line 86, contact members 83 are opened and the motor 70 is deenergized to prevent the level of the liquid from falling below the spray head.

It will be noted that motors 22, 32 and 42 are connected in parallel circuit relation and for energization to a current source 88 through normally closed contact members 89, which are controlled by a float 90. When the level of the liquid rises substantially above a predetermined point, i. e., the level indicated by the broken line 85, contact members 89 are opened, motors 22, 32 and 42 are deenergized, and further flow to the tank 14 is arrested.

The current source 88 may be any suitable source such as a 110 volt, 60 cycle source. It is also used, as shown, for energizing the motor 70 through contact members 79 and 83 and for energizing the measuring means 76.

Once the system described hereinbefore is properly set into operation, it will continue to operate automatically as long as the foregoing conditions are maintained.

Since certain changes can be made in the foregoing system and different embodiments thereof can be made without departing from the spirit and scope of this invention, it is intended that all matter described herein or shown in the accompanying drawing, shall be interpreted as illustrative and not in a limiting sense.

Having thus described the invention, what is claimed is:

1. That method of partially dehydrating and cleansing an oily wood preservative having a specific gravity greater than one, which is characterized by, introducing contaminated creosote preservative and wash-water into a settling tank; allowing the mixture to separate in the tank; measuring the moisture content of the settled preservative in the bottom portion of the tank; withdrawing the settled preservative from a point adjacent to the bottom of the tank in response to said measurements; and automatically removing separated wash water from the upper portion of the tank.

2. The method, as set forth in claim 1, wherein a separating agent is also introduced with the preservative and wash-water; controlling the amounts of preservative, wash-water and separating agent delivered to the tank; and draining the excess wash-water from the upper portion of the tank as the mixture is introduced therein.

3. That method of partially dehydrating and cleansing a contaminated oily wood preservative having a specific gravity greater than one, which is characterized by delivering measured quantities of the preservative and wash-water to the top portion of a settling tank; intimately mixing the liquids to form a temporary emulsion; maintaining the body of liquid in a substantially quiescent state and thereby permitting the preservative to settle; measuring the degree of dryness of the settled preservative near the bottom of the tank; discharging the preservative as it reaches a predetermined degree of dryness; and draining separated wash-water from the upper level of the body of liquid as the contaminated preservative and the wash-water are delivered.

4. The method, as set forth in claim 3, wherein the mixed preservative and wash-water are delivered under pressure in the form of a spray into the tank below the liquid level therein.

5. The method, as set forth in claim 3, wherein the degree of dryness of the settled preservative is automatically measured at spaced levels to control the discharge of the preservative.

6. The method, as set forth in claim 3, wherein the degree of dryness of the settled preservative is automatically measured at spaced levels to control the discharge of the preservative; and automatically maintaining the liquid level in the tank between a predetermined maximum and minimum.

7. The method, as set forth in claim 3, wherein the degree of dryness of the settled preservative is automatically measured at spaced levels to control the discharge of the preservative; automatically maintaining the liquid level in the tank between a predetermined maximum and minimum; and maintaining the rate of draining the separated wash-water always less than the rate of delivery of the mixture of preservative and wash-water.

8. Apparatus for partially dehydrating and cleansing contaminated oily wood preservative having a specific gravity greater than 1, comprising in combination, a settling tank adapted to be filled with an aqueous emulsion of the preservative; a spray head submerged in the solution for introducing a water emulsion containing the contaminated preservative into the tank near the top to maintain the tank substantially full; a motor operated pump connected to the bottom portion of the tank for withdrawing settled preservative therefrom; a motor operated pump for supplying the emulsion to the tank; automatic electrical resistance means, including a pair of vertically spaced electrical probes near the bottom portion of the tank and electronically operated switch means connected to control the operation of both of said pumps in response to changes in electrical resistance of the liquid in the tank adjacent to said probes, whereby the liquid level in the tank is maintained while the cleansed preservative is being withdrawn; and a valve controlled drain connected to the upper portion of the tank for discharging separated wash water therefrom.

9. Apparatus, as set forth in claim 8, wherein the electronically operated switch means is adjustable to control the periodic discharge of the settled out preservative in response to the desired degree of dryness thereof.

JOSEPH A. VAUGHAN.
JOSEPH C. VINSON.

REFERENCES CITED

The following references are of record in the file of this patent:

UNITED STATES PATENTS

| Number | Name | Date |
|---|---|---|
| 348,869 | Tracy | Sept. 7, 1886 |
| 753,860 | Destombes | Mar. 8, 1904 |
| 929,266 | Albert | July 27, 1909 |
| 1,516,132 | Allen et al. | Nov. 18, 1924 |
| 1,559,036 | Egloff et al. | Oct. 27, 1925 |
| 1,722,160 | Smith | July 23, 1929 |
| 1,768,209 | Miller | June 24, 1930 |
| 1,770,736 | Funk | July 15, 1930 |
| 1,923,557 | Schmitt | Aug. 22, 1933 |
| 1,954,405 | Dotterweich | Apr. 10, 1934 |
| 1,995,829 | Wise | Mar. 26, 1935 |
| 2,021,655 | Jonas | Nov. 19, 1935 |
| 2,037,218 | Empson | Apr. 14, 1936 |
| 2,047,989 | Woelflin | July 21, 1936 |
| 2,072,206 | Hetzer | Mar. 2, 1937 |
| 2,193,569 | Seaton | Mar. 12, 1940 |
| 2,216,977 | Mahone | Oct. 8, 1940 |
| 2,263,398 | Robinson | Nov. 18, 1941 |
| 2,288,333 | Vinson | June 30, 1942 |
| 2,323,524 | Downs, Jr. | July 6, 1943 |
| 2,325,925 | Waugh | Aug. 3, 1943 |
| 2,330,008 | Robinson | Sept. 21, 1943 |
| 2,357,371 | Wolfner | Sept. 5, 1944 |